United States Patent [19]

Walters et al.

[11] 4,205,032

[45] * May 27, 1980

[54] METHOD FOR PRODUCING RIGID ARTICLES OF REFRACTORY FIBERS

[75] Inventors: Ian R. Walters, Huddersfield; Harold G. Emblem, Mirfield, both of England

[73] Assignee: Zirconal Processes Limited, Bromley, England

[*] Notice: The portion of the term of this patent subsequent to May 24, 1994, has been disclaimed.

[21] Appl. No.: 11,714

[22] Filed: Feb. 12, 1979

Related U.S. Application Data

[63] Continuation-in-part of Ser. No. 786,238, Apr. 11, 1977, abandoned, which is a continuation-in-part of Ser. No. 561,347, Mar. 24, 1975, Pat. No. 4,025,350, and Ser. No. 780,352, Mar. 23, 1977, Pat. No. 4,102,691.

[30] Foreign Application Priority Data

Mar. 28, 1974 [GB] United Kingdom .............. 13834/74
Aug. 13, 1974 [GB] United Kingdom .............. 35610/74

[51] Int. Cl.$^2$ ............................................. C04B 35/64
[52] U.S. Cl. ................................... 264/63; 106/38.35; 106/57; 106/65; 264/134; 264/136; 428/288
[58] Field of Search .................. 264/63, 62, 134, 136; 428/288; 106/38.35, 57, 65

[56] References Cited

U.S. PATENT DOCUMENTS

| | | | |
|---|---|---|---|
| 2,315,713 | 4/1943 | Johnson | 106/38.35 |
| 3,232,771 | 2/1966 | Pearce | 106/38.35 |
| 3,607,319 | 9/1971 | Scott | 106/38.35 |
| 3,854,961 | 12/1974 | Flasch | 106/38.35 |
| 4,025,350 | 5/1977 | Walters et al. | 106/38.35 |
| 4,102,691 | 7/1978 | Walters et al. | 106/38.35 |

*Primary Examiner*—Lorenzo B. Hayes
*Attorney, Agent, or Firm*—Christensen, O'Connor, Johnson & Kindness

[57] ABSTRACT

The present invention provides a method of rigidizing articles of refractory fibres. This is achieved by impregnating the fibre article with a zirconium salt, a gellation-inducing agent and a gellation-delaying agent.

3 Claims, No Drawings

METHOD FOR PRODUCING RIGID ARTICLES OF REFRACTORY FIBERS

The application is a Continuation-in-Part based on our application Ser. No. 786,238, now abandoned, filed April 11, 1977, which in turn is a Continuation-in-Part of our Application Ser. No. 561,347 filed Mar. 24, 1975, now U.S. Pat. No. 4,025,350, and our Application Ser. No. 780,352, filed Mar. 23, 1977, now U.S. Pat. No. 4,102,691. The disclosures of the foregoing applications are hereby expressly incorporated by reference.

This invention relates to the rigidisation of fibres for refractory applications.

In accordance with the present invention a generally flat-sheet or blanket-like inherently flexible aggregate of woven or felted refractory fibres is rigidised by contact, preferably to impregnation, with either an aqueous solution of a zirconium salt which when dissolved in water yields an aqueous solution that is acidic, a gellation-inducing agent, and a gellation-delaying agent; said gellation-inducing agent being selected from the group consisting of aminoalcohols, morpholine, dead burned magnesia powder and powdered magnesia-containing spinels and said gellation-delaying agent being selected from the group consisting of magnesium acetate, magnesium lactate, ammonium lactate, glycine, betaine, monosaccharides, fructose and polyhydric alcohols or an aqueous solution of a zirconium salt which when dissolved in water yields an aqueous solution that is alkaline, a gellation-inducing agent, and a gellation-delaying agent; said gellation-inducing agent being selected from the group consisting of dead burned magnesia powder and powdered magnesia containing spinel, and said gellation-delaying agent being selected from the group consisting of magnesium acetate, magnesium lactate, ammonium lactate, glycine, betaine, fructose, and a polyhydric alcohol selected from the group glycerol, sorbitol and mannitol.

The refractory fibres are preferably ceramic fibres made up of alumina or zirconia but the use of alumina silicate fibres and mineral wool is not precluded.

The sheet or blanket-like aggregate can be formed into the desired shape after impregnation but prior to rigidisation and subsequent firing.

The invention will now be described by way of example:

EXAMPLE

Rigidisation of Ceramic fibre using a zetabond-amino alcohol binding system

Alumina and Zirconia Ceramic Fibres in the form of a blanket were impregnated with a solution consisting of equal parts by volume of 20 gm magnesium acetate ($4H_2O$) crystals/100 ml zirconium acetate solution (containing zirconium corresponding to a $ZrO_2$ content of 22% by weight nominal) and 50% aqueous solution of tri(hydroxymethyl) methylamine. The magnesium acetate is a gellation-delaying agent and the aminoalcohol a gellation-inducing agent. The fibre was compressed to remove excess liquid and then allowed to set at ambient temperature (fairly rigid blanket obtained on standing for 2 hours). Samples were allowed to stand overnight and then fired to 1000° C. The resulting fired pieces were rigid and free from cracks and delamination.

Similar results were obtained using the above solution containing 2½% by volume of triethanolamine titanate, in this case rigidisation of blanket at ambient temperature required a longer period, because triethanolamine titanate acts as an additional gellation-drying agent, leaving when fired a highly refractory residue.

We claim:

1. A method of producing a rigid refractory article of refractory fibres comprising:
   (a) impregnating an article of refractory fibres with an aqueous solution of a zirconium salt which when dissolved in water yields an aqueous solution that is acidic, a gellation-inducing agent, and a gellation-delaying agent; said gellation-inducing agent is selected from the group consisting of aminoalcohols, morpholine, dead burned magnesia powder and powdered magnesia-containing spinels and said gellation-delaying agent is selected from the group consisting of magnesium acetate, magnesium lactate, ammonium lactate, glycine, betaine, fructose and polyhydric alcohols; the amounts of the solution of zirconium salt, gellation-inducing agent and gellation-delaying agent is such that the article will rigidise on standing;
   (b) forming the impregnated article to the desired shape;
   (c) allowing the impregnated article to set; and
   (d) firing the impregnated article to form a rigid refractory article.

2. A method according to claim 1 wherein the zirconium salt is zirconium acetate, the gellation-delaying agent is magnesium acetate and the gellation-inducing agent is an aminoalcohol.

3. A method according to claim 2 including triethanolamine titanate as an additional gellation-delaying agent.

* * * * *